US008086559B2

(12) United States Patent
Anderson et al.

(10) Patent No.: US 8,086,559 B2
(45) Date of Patent: Dec. 27, 2011

(54) SERVING CONTENT-RELEVANT ADVERTISEMENTS WITH CLIENT-SIDE DEVICE SUPPORT

(75) Inventors: Darrell Anderson, Mountain View, CA (US); Paul Buchheit, Mountain View, CA (US); Jeffrey A. Dean, Menlo Park, CA (US); Georges R. Harik, Mountain View, CA (US); Carl Laurence Gonsalves, Mountain View, CA (US); Noam Shazeer, Palo Alto, CA (US); Narayanan Shivakumar, San Jose, CA (US)

(73) Assignee: Google, Inc., Mountain View, CA (US)

( * ) Notice: Subject to any disclaimer, the term of this patent is extended or adjusted under 35 U.S.C. 154(b) by 1892 days.

(21) Appl. No.: 10/634,501

(22) Filed: Aug. 5, 2003

(65) Prior Publication Data
US 2004/0167928 A1 Aug. 26, 2004

Related U.S. Application Data

(63) Continuation-in-part of application No. 10/375,900, filed on Feb. 26, 2003, now Pat. No. 7,136,875, which is a continuation-in-part of application No. 10/314,427, filed on Dec. 6, 2002, now Pat. No. 7,716,161, which is a continuation-in-part of application No. 10/453,909, filed on Jun. 3, 2003.

(60) Provisional application No. 60/413,536, filed on Sep. 24, 2002.

(51) Int. Cl.
*G06F 17/00* (2006.01)

(52) U.S. Cl. ...... 707/102; 707/100; 707/101; 707/104.1

(58) Field of Classification Search ...... 707/3, 100–102, 707/401.1
See application file for complete search history.

(56) References Cited

U.S. PATENT DOCUMENTS 5,724,521 A 3/1998 Dedrick
(Continued)

FOREIGN PATENT DOCUMENTS

EP 0913779 5/1999
(Continued)

OTHER PUBLICATIONS

Translation of Notification of Reasons for Rejection to Japanese Patent Application No. 2005-501985, mailed Nov. 6, 2007 (3 pgs.).
(Continued)

*Primary Examiner* — Sana Al-Hashemi
(74) *Attorney, Agent, or Firm* — John C. Pokotylo; Straub & Pokotylo

(57) ABSTRACT

A client-side application (such as a browser, a browser plug-in, a browser toolbar plug-in, etc. on an end user's computer) is used to support the serving of content-relevant ads to the client device. The client-side application may provide such support by sending document information (such as a document identifier, document content, content relevance information, etc.) to a content ad server. The client-side application may also be used to combine content of the document and the content-relevant ads. For example, the client-side application may combine content of the document and the ads in a window (e.g., in a browser window), may provide the ads in a window above, below, adjacent to a document window, may provide the ads in "chrome" of the browser, etc.

44 Claims, 6 Drawing Sheets

U.S. PATENT DOCUMENTS

| | | | |
|---|---|---|---|
| 5,740,549 | A | 4/1998 | Reilly et al. |
| 5,754,938 | A | 5/1998 | Herz et al. |
| 5,794,050 | A | 8/1998 | Dahlgren et al. |
| 5,809,242 | A | 9/1998 | Shaw et al. |
| 5,815,830 | A | 9/1998 | Anthony |
| 5,822,539 | A | 10/1998 | Van Hoff |
| 5,848,397 | A | 12/1998 | Marsh et al. |
| 5,848,407 | A | 12/1998 | Ishikawa |
| 5,887,133 | A | 3/1999 | Brown et al. |
| 5,948,061 | A * | 9/1999 | Merriman et al. ............ 709/219 |
| 6,026,368 | A | 2/2000 | Brown et al. |
| 6,044,376 | A | 3/2000 | Kurtzman, II |
| 6,078,914 | A | 6/2000 | Redfern |
| 6,134,532 | A | 10/2000 | Lazarus et al. |
| 6,141,010 | A | 10/2000 | Hoyle |
| 6,144,944 | A | 11/2000 | Kurtzman, II et al. |
| 6,167,382 | A | 12/2000 | Sparks et al. |
| 6,269,361 | B1 | 7/2001 | Davis et al. |
| 6,308,202 | B1 | 10/2001 | Cohn et al. |
| 6,327,574 | B1 | 12/2001 | Kramer et al. |
| 6,356,898 | B2 | 3/2002 | Cohen et al. |
| 6,360,221 | B1 | 3/2002 | Gough et al. |
| 6,366,298 | B1 | 4/2002 | Haitsuka et al. |
| 6,385,592 | B1 | 5/2002 | Angles et al. |
| 6,401,075 | B1 | 6/2002 | Mason et al. |
| 6,449,657 | B2 | 9/2002 | Stanbach, Jr. et al. |
| 6,516,321 | B1 | 2/2003 | De La Huerga |
| 6,584,492 | B1 * | 6/2003 | Cezar et al. ................... 709/203 |
| 6,665,656 | B1 | 12/2003 | Carter |
| 6,665,838 | B1 | 12/2003 | Brown et al. |
| 6,681,223 | B1 | 1/2004 | Sundaresan |
| 6,772,200 | B1 | 8/2004 | Bakshi et al. |
| 6,804,659 | B1 | 10/2004 | Graham et al. |
| 6,892,181 | B1 * | 5/2005 | Megiddo et al. ................ 705/14 |
| 6,892,354 | B1 * | 5/2005 | Servan-Schreiber et al. . 715/733 |
| 6,985,882 | B1 | 1/2006 | Del Sesto |
| 7,013,298 | B1 | 3/2006 | De La Huerga |
| 7,039,599 | B2 | 5/2006 | Merriman |
| 7,136,875 | B2 | 11/2006 | Anderson et al. |
| 7,139,732 | B1 | 11/2006 | Desenberg |
| 2002/0120505 | A1 | 8/2002 | Henkin |
| 2002/0123912 | A1 | 9/2002 | Subramanian |
| 2004/0073485 | A1 | 4/2004 | Liu et al. |
| 2004/0249709 | A1 | 12/2004 | Donovan et al. |

FOREIGN PATENT DOCUMENTS

| | | |
|---|---|---|
| JP | 9-311870 | 12/1997 |
| JP | 11-045278 | 2/1999 |
| JP | 11-175569 | 7/1999 |
| JP | 2001-243256 | 9/2001 |
| JP | 2001-307464 | 11/2001 |
| JP | 2002-108924 | 4/2002 |
| JP | 2002-117049 | 4/2002 |
| JP | 2002-245061 | 8/2002 |
| JP | 2002-259790 | 9/2002 |
| KR | 2001-90950 | 10/2001 |
| KR | 2001-97432 | 11/2001 |
| WO | WO 97/21183 | 6/1997 |
| WO | WO 98/20410 | 5/1998 |
| WO | WO 98/59303 | 12/1998 |
| WO | WO 01/44992 A1 | 6/2001 |
| WO | WO 01/50320 | 7/2001 |
| WO | WO 01/63472 A2 | 8/2001 |

OTHER PUBLICATIONS

Notice of Preliminary Rejection to Korean Patent Application No. 10-2005-7005098, mailed Oct. 23, 2006 (4 pgs.) with translation (5 pgs.).

Tenenbaum, et al. "Eco System: An Internet Commerce Architecture," *IEEE Computer*, pp. 48-55, (May 1997).

Myka, A., "Automatic Hypertext Conversion of Paper Document Collections," (ch. 6), *Digital Libraries Workshop*, pp. 65-90, DL '94, (Newark NJ) (May 1994) (selected papers).

Graham, I., *The HTML Sourcebook*, pp. iii-viii; 22-27, 87, 88, 166-168 and 409-416, John Wiley & Sons (1995) (ISBN 0471118494).

Thistlewaite, P., "Automatic Construction and Management Of Large Open Webs," *Information Processing and Management; An international Journal* (Ed. Tefko Saracevic), vol. 33, No. 2, pp. 161-173 (Mar. 1997) (ISSN 0306-4573).

Mills, T., "Providing World Wide Access To Historical Sources," *Computer Networks and ISDN Systems*, vol. 29, Nos. 8-13, pp. 1317-1325, (Sep. 1997) (Presented at Sixth Int'l World Wide Web Conf., Santa Clara, CA (Apr. 7-11, 1997)).

Examiner's First Report for Australian Application No. 2003275253 dated Jun. 8, 2006 (2 pgs.).

Examiner's Report No. 2 for Australian Application No. 2003275253 dated Dec. 14, 2007 (2 pgs.).

First Examination Report for Indian Patent Application No. 695/CHENP/2005, dated Apr. 13, 2006 (2 pgs.).

Acey, Madleine, "Web ads that hit the button, Broker dynamically targets news content," *FTMarketWatch*, (May 10, 2001), 2 pgs.

Notification of the First Office Action for Chinese Patent Application No. 03824458.6, dated Feb. 15, 2008 (9 pgs.), with translation (17 pgs.).

Supplementary European Search Report to EPO Patent Application No. 03759525.3, mailed on May 21, 2007 (3 pgs.).

Ubiquitous Advertising on the WWW: Merging Advertisement on the Browser. Youji Kohda and Susumu Endo. Fifth International World Wide Web Conference. (May 6-10, 1996).

C. Aggarwal, J. Wolf and P. Yu, "A Framework for the Optimizing of WWW Advertising," *International IFIP Working Conference on Electronic Commerce*, Hamburg, Germany, 1998, published in Trends in Distributed Systems for Electronic Commerce, edited by W. Lamersdorf and M. Merz, Springer-Verlag Lecture Notes in Computer Science, vol. 1402, pp. 1-10, 1998.

Unintrusive Customization Techniques for Web Advertising. Marc Langheinrich et al. Computer Networks. vol. 31. No. 11-16. pp. 1259-1272. (Published 1999).

Recommending from Content: Preliminary Results from an E-Commerce Experiment, Mark Rosenstein and Carol Lochbaum. CHI 2000. Published Apr. 1-6, 2000, The Hague, The Netherlands.

J. Matthews, "Automating Ad Intelligence," SiliconValley, downloaded from http://www.siliconvalley.internet.com/news/article.php/3531_, (Jun. 20, 2000) 4 pgs.

Canadian Office Action to Canadian Patent Application No. 2,499,669, dated Jun. 3, 2008 (3 pgs.).

U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.

Dedrick, R., Interactive Electronic Advertising, IEEE, 1994.

Dedrick, R., A Consumption Model for Targeted Electronic Advertising, Intel Architecture Labs, IEEE, 1995.

Baseview Products, Inc., ClassManagerPro Administration Manual v. 1.0.5, Feb. 1, 1997.

Ad-Star.com website archive from www.Archive.org, Apr. 12, 1997 and Feb 1, 1997.

Information Access Technologies, Inc., Aaddzz brochure, "The Best Way to Buy and Sell Web Advertising Space," © 1997.

Information Access Technologies, Inc., Aaddzz.com website archive from www.Archive.org, archived on Jan. 30, 1998.

AdKnowledge Market Match Planner: Reviewer's Guide, AdKnowledge, May 1998.

AdKnowledge Campaign Manager: Reviewer's Guide, AdKnowledge, Aug. 1998.

Baseview Products, Inc., AdManagerPro Administration Manual v. 2.0, Dec. 1998.

AdForce, Inc., A Complete Guide to AdForce, Version 2.6, 1998.

AdForce, Inc., S-1/A SEC Filing, May 6, 1999.

Business Wire, "Global Network, Inc. Enters Into Agreement in Principle With Major Advertising Agency," Oct. 4, 1999.

Zeff, R. et al., *Advertising on the Internet*, 2$^{nd}$ Ed., John Wiley & Sons, 1999.

Canadian Office Action to Canadian Patent Application No. 2,499,807, dated May 7, 2009 (13 pgs.).

Decision of Rejection for Japanese Patent Application No. 2005-501985, mailed May 12, 2009 (2 pgs.) with translation (2 pgs.).

Petitioner's First Brief Against Korean Patent No. 788,180, dated Jun. 11, 2008 (46 pgs.) (with summarized English translation (11 pgs.)).
First Reply Brief for Invalidation Trial Against Korean Patent No. 788,180, dated Jul. 22, 2008 (37 pgs.) (with English translation (17 pgs.)).
Petitioner's Second Brief Against Korean Patent No. 788,180, dated Dec. 2, 2008 (45 pgs.) (with summarized English translation (12 pgs.)).
Second Reply Brief for Invalidation Trial Against Korean Patent No. 788,180, dated Jan. 20, 2009 (30 pgs.) (with English translation (18 pgs.)).
Petitioner's Third Brief Against Korean Patent No. 788,180, dated Feb. 9, 2009 (34 pgs.) (with summarized English translation (9 pgs.)).
Petitioner's Fourth Brief Against Korean Patent No. 788,180, dated Feb. 24, 2009 (13 pgs.) (with summarized English translation (7 pgs.)).
Third Reply Brief for Invalidation Trial Against Korean Patent No. 788,180, dated Feb. 25, 2009 (29 pgs.) (with English translation (12 pgs.)).
Fourth Reply Brief for Invalidation Trial Against Korean Patent No. 788,180, dated Mar. 26, 2009 (21 pgs.) (with English translation (8 pgs.)).
Decision Rendered by Trial Board for Invalidation Trial Against Korean Patent No. 788,180, dated Mar. 31, 2009 (55 pgs.) (with English translation (15 pgs.)).
Appeal Brief for Invalidation Trial Against Korean Patent No. 788,180, dated Jul. 14, 2009 (32 pgs.) (with English translation (24 pgs.)).
Respondent's First Reply Brief for Invalidation Trial Against Korean Patent No. 788,180, dated Oct. 14, 2009 (71 pgs.) (with summarized English translation (10 pgs.)).
Google's Brief for Invalidation Trial Against Korean Patent No. 788,180, dated Nov. 13, 2009. (13 pgs.) (with English translation (7 pgs.)).
Respondent's Brief for Invalidation Trial Against Korean Patent No. 788,180, dated Mar. 16, 2010 (32 pgs.).
Power Point Presentation from a hearing for Invalidation Trial Against Korean Patent No. 788,180, dated Mar. 16, 2010 (24 pgs.).
English Translation of Google's Supplementary Brief for Invalidation Trial Against Korean Patent No. 788,180, (10 pgs.), dated Apr. 15, 2010.
English Summary of Patent Court's Decision (English) for Invalidation Trial Against Korean Patent No. 788,180, dated Apr. 28, 2010 (9 pgs.).
Notification of the Second Office Action for Chinese Patent Application No. 03824458.6, dated Feb. 5, 2010 (17 pgs.), with translation (10 pgs.).
Notification of the Third Office Action for Chinese Patent Application No. 03824458.6, dated Aug. 30, 2010 (4 pgs.), with translation (6 pgs.).
Notification of the Fourth Office Action for Chinese Patent Application No. 03824458.6, mailed Feb. 22, 2011 (6 pgs.) with translation (8 pgs.).
Official Letter of Inquiry for Japanese Patent Application No. 2005-501985, mailed Mar. 29, 2011 (3 pgs.) with (3 pgs.).
Notification of the Fifth Office Action for Chinese Patent Application No. 03824458.6, mailed May 20, 2011 (13 pgs.) with translation (18 pgs.).
Office Action for U.S. Appl. No. 12/945,999, mailed May 12, 2011 (12 pgs.).

* cited by examiner

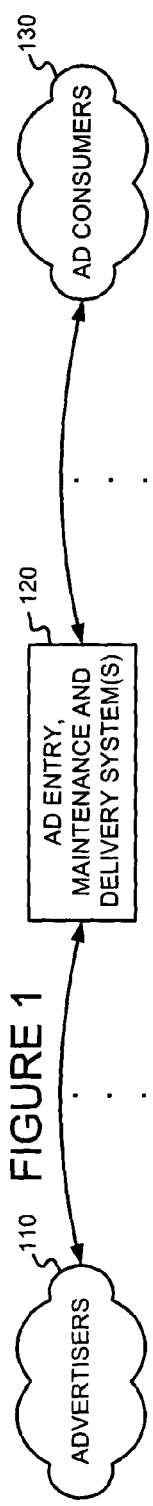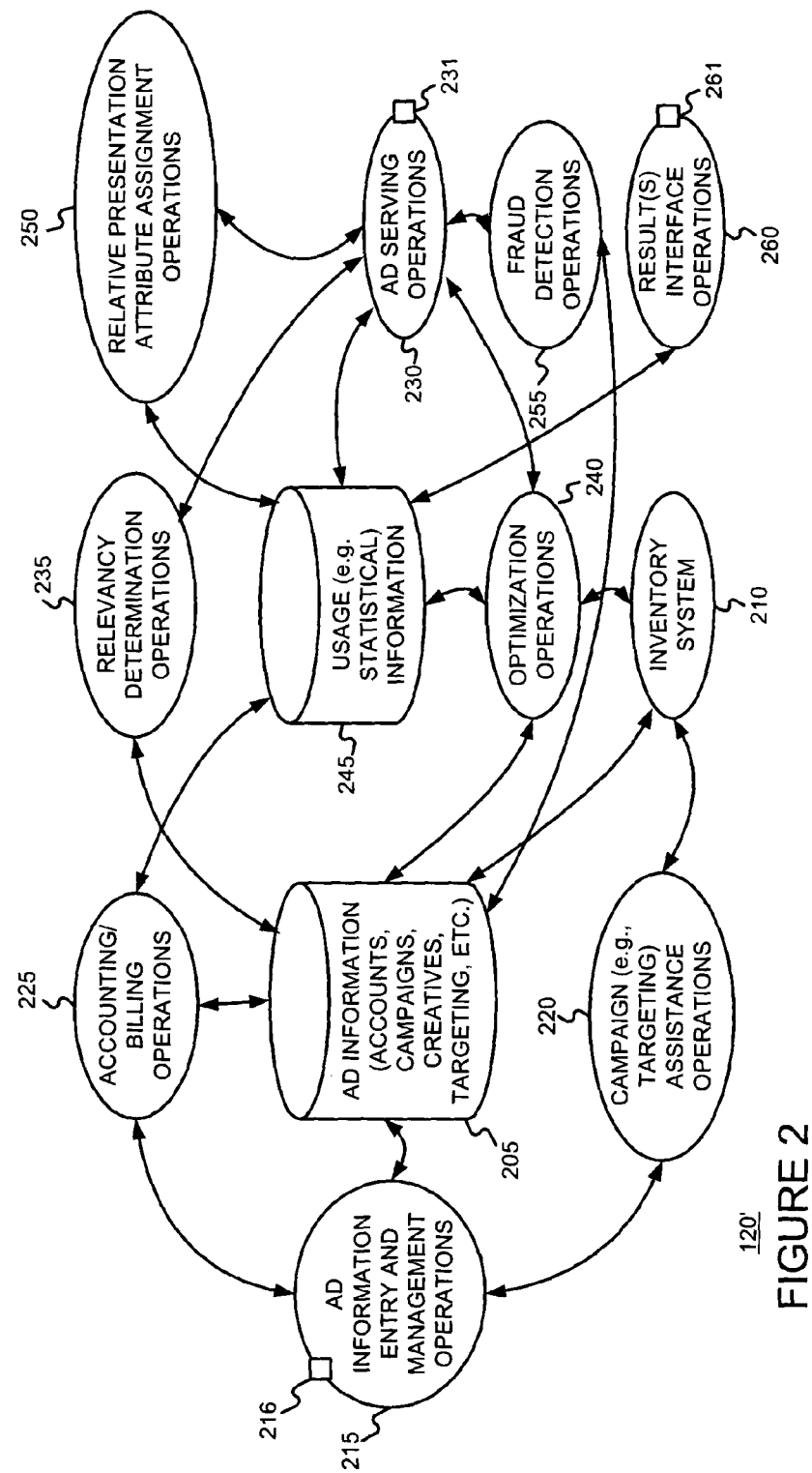

SERVING CONTENT-RELEVANT ADVERTISEMENTS WITH CLIENT-SIDE DEVICE SUPPORT

§0. RELATED APPLICATIONS

This application is a continuation-in-part of U.S. application Ser. No. 10/375,900 (incorporated herein by reference) entitled "SERVING ADVERTISEMENTS BASED ON CONTENT," filed on Feb. 26, 2003 now U.S. Pat. No. 7,136,875, and listing Darrell Anderson, Paul Bucheit, Alex Carobus, Claire Cui, Jeffrey A. Dean, Georges R. Harik, Deepak Jindal, and Narayanan Shivakumar as inventors, which is a continuation-in-part of U.S. patent application Ser. No. 10/314,427 (incorporated herein by reference), entitled "METHODS AND APPARATUS FOR SERVING RELEVANT ADVERTISEMENTS", filed on Dec. 6, 2002, now U.S. Pat. No. 7,716,161, and listing Jeffrey A. Dean, Georges R. Harik and Paul Bucheit as inventors, which claims the benefit of U.S. Provisional Application Ser. No. 60/413,536 (incorporated herein by reference), entitled "METHODS AND APPARATUS FOR SERVING RELEVANT ADVERTISEMENTS", filed on Sep. 24, 2002 and listing Jeffrey A. Dean, Georges R. Harik and Paul Bucheit as inventors.

This application is also a continuation-in-part of U.S. application Ser. No. 10/453,909 (incorporated herein by reference) entitled "PROACTIVE SYNDICATION FOR THE SERVING OF ADVERTISEMENTS," filed on Jun. 3, 2003 and listing Krishna Bharat, Gokul Rajaram, Marshall Spight and Narayanan Shivakumar as inventors.

§1. BACKGROUND OF THE INVENTION

§1.1 Field of the Invention

The present invention concerns advertising. In particular, the present invention concerns expanding the opportunities for advertisers to target their ads.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Website.

Regardless of the strategy, Website-based ads (also referred to as "Web ads") are typically presented to their advertising audience in the form of "banner ads" (i.e., a rectangular box that may include graphic components). When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.).

Advertisers may judge the efficacy of an advertising campaign using a number of measurable or determinable user behaviors, such as click-throughs, click-through rates, conversions, conversion rates, etc. The ratio of the number of click-throughs to the number of impressions of the ad (i.e., the number of times an ad is displayed) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment.

Similarly, the hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com", which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page generated from a query. Although search result pages afford advertisers a great opportunity to target their ads to a more receptive audience, search result pages are merely a fraction of page views of the World Wide Web (referred to as "the Web").

Existing client-side advertising software systems (such as that used by the Gator Corporation of Redwood City, Calif.) can show ads within a user's browser or on the user's desktop in response to a Web page being viewed without awareness or participation by the content owner. Such systems may require a presence on the client (end user's) computer and generally require the end user's permission. In the Gator system, ads may be targeted to users using (i) demographic and lifestyle profiles, (ii) behavioral targeting (which allows targeted, customize messages to be displayed on users' computer screens based on their individual online behavior), (iii) historical targeting (which allows targeted, customized ads to be displayed on users' computer screens based on past behavior), and (iv) tag-a-long targeting (which allows targeted, customized ads to be displayed on users' computer screens whose online behavior has indicated an interest, but also delivers multiple impressions as they travel around the Web). Unfortunately, although past user behavior is often a useful metric for determining what ad(s) to serve to a user, such past behavior might not be indicative of a current user interest. Further, past user behavior for a given user may be difficult to track if more than one person (such as different members of a family) use the same computer and browser to access the Internet. Furthermore, tracking the online habits of a user raises delicate issues of that user's privacy. Moreover, if such past user behavior is stored locally on the user's computer, it may consume needed storage resources.

Thus, there is a need to utilize advertising opportunities on the Web more fully. Doing so should help the ad server show more ads and enhance the experience of end users by serving relevant ads.

§2. SUMMARY OF THE INVENTION

A client-side application (such as a browser, a browser plug-in, a browser toolbar plug-in, etc. on an end user's computer) is used to support the serving of content-relevant ads to the client device. The client-side application may provide such support by sending document information (such as a document identifier, document content, content relevance information, etc.) to a content-relevant ad server (referred to simply as a "content ad server" or "CAS").

The client-side application may also be used to combine content of the document and the content-relevant ads. For example, the client-side application may combine content of the document and the ads in a window (e.g., in a browser window), may provide the ads in a window above (e.g., as a "pop up" window), below (as a "pop under" window), or adjacent to a document window, may provide the ads in "chrome" of the browser, etc.

§3. BRIEF DESCRIPTION OF THE DRAWINGS

FIG. 1 is a high-level diagram showing parties or entities that can interact with an advertising system.

FIG. 2 is a bubble chart of an exemplary advertising environment with which the present invention may operate.

§4. DETAILED DESCRIPTION

Figure 3:
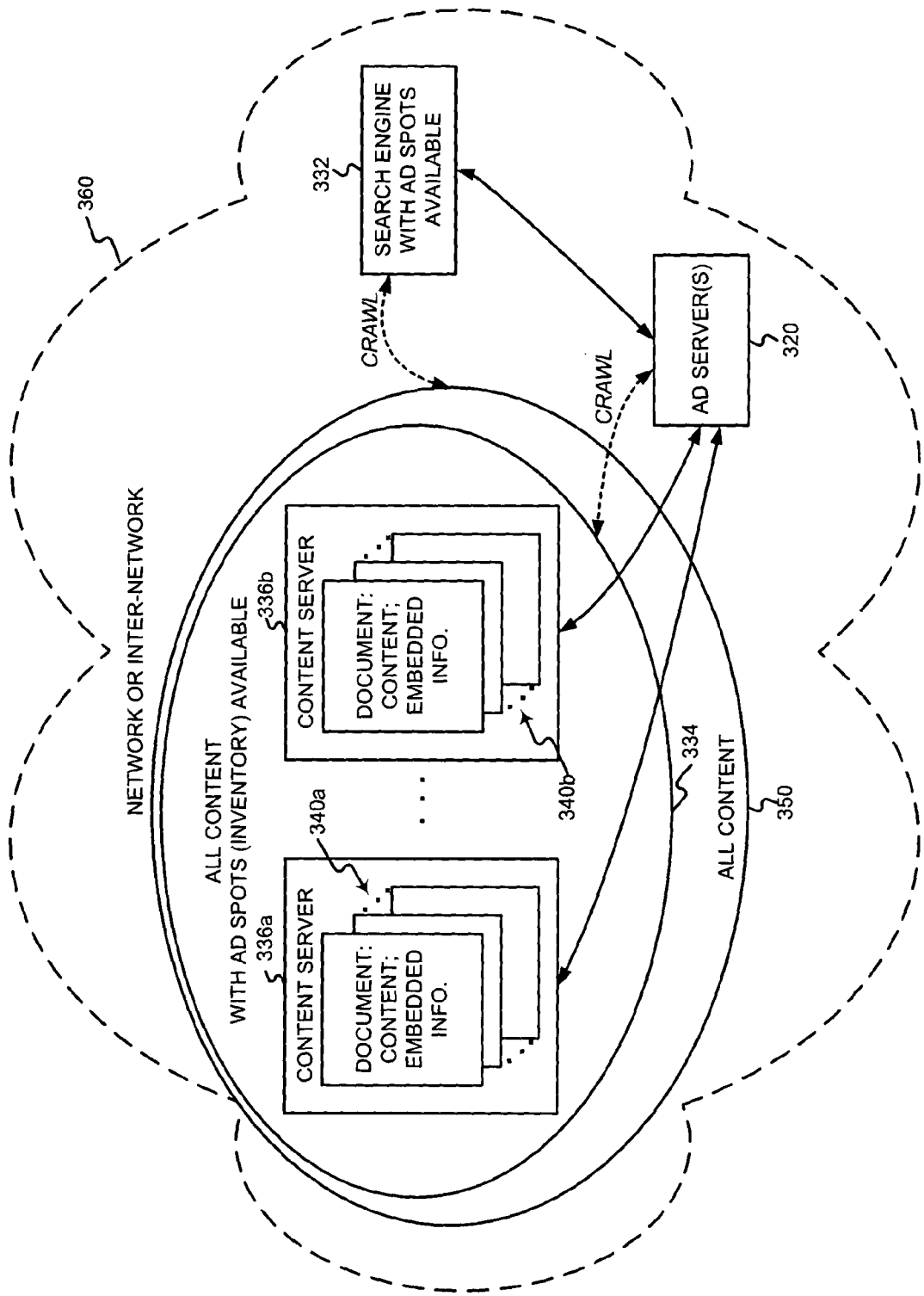
FIG. 3 illustrates an environment in which advertisers can target their ads on search results pages generated by a search engine and/or documents served by content servers.

The present invention may involve novel methods, apparatus, message formats and/or data structures for facilitating the serving of content-relevant ads using client-side applications. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments with which the present invention may operate are described in §4.1. Then, exemplary embodiments of the present invention are described in §4.2. Finally, some conclusions regarding the present invention are set forth in §4.3.

§4.1 Environments in which, or with which, the Present Invention May Operate

§4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for documents (e.g., articles, discussion threads, music, video, graphics, search results, Web page listings, etc.), and retrieves the requested document in response to, or otherwise services, the request. The content server may submit a request for ads to the system 120. Such an ad request may include a number of ads desired. The ad request may also include document request information. This information may include the document itself (e.g., page), a category corresponding to the content of the document or the document request (e.g., arts, business, computers, arts-movies, arts-music, etc.), part or all of the document request, content age, content type (e.g., text, graphics, video, audio, mixed media, etc.), geolocation information, content subject matter (e.g., level of ad-safety, porn filters, family filters, etc.), etc.

The content server may combine the requested document with one or more of the advertisements provided by the system 120. This combined information including the document content and advertisement(s) is then forwarded towards the end user that requested the document, for presentation to the user. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

As described in U.S. patent application Ser. No. 10/452, 830, filed on Jun. 2, 2003 (incorporated herein by reference), entitled "SERVING ADVERTISEMENTS USING INFORMATION ASSOCIATED WITH E-MAIL", and listing Jeffrey A. Dean, Georges R. Harik, and Paul Bucheit as inventors, the content may be e-mail information. In such a case, the content server may be an e-mail server such as Yahoo mail or Microsoft HotMail.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, feature vectors of identified documents, etc.

The search engine may combine the search results with one or more of the advertisements provided by the system 120. This combined information including the search results and advertisement(s) is then forwarded towards the user who submitted the search, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

Although ad requests can be initiated and/or sent by content servers and search engines, a client device (e.g., a users computer, personal digital assistant, mobile phone, mobile device, etc.) may also act as an ad consumer 130. For example, an application residing on a client device may submit an ad request to the ad system 120. The request may include information about a document on (or requested by) the client device (e.g., a Web page on a content rendering application such as a Browser, an e-mail on an e-mail application, etc.). For example, the ad request may include information about the document, such as content-relevance information, concepts, topics, etc. Document information provided in the request may include content (information) of the document, or other information (e.g. a URL) that allows such information to be obtained.

As can be appreciated from the foregoing, an ad entry, maintenance and delivery system(s) 120 may serve ad consumers 130 such as content servers, search engines, and client devices. As discussed in §1.2 above, the serving of ads targeted to the search results page generated by a search engine is known. The present invention further permits the serving of ads targeted to documents served by content servers. For example, referring to the exemplary environment of FIG. 3, a network or inter-network 360 may include an ad server 320 serving targeted ads on search result page(s) from a search engine 332. Suppose that the inter-network 350 is the Web. The search engine 332 crawls much or all of the content 350. Some 334 of this content 350 will include ad spots (also referred to as "inventory") available. More specifically, one or more content servers 336 may include one or more documents 340. Documents may include content, embedded information such as meta information and machine executable instructions, and ad spots available. Note that ads inserted into ad spots in a document can vary each time the document is served. Alternatively, ads inserted into ad spots can have a static association with a given document. As will be described in more detail below, an ad server may use the results of a separate crawl of the some or all of the content with ad spots available 334. Even if the document does not include explicitly defined available ad spots, it may be determined that ads can be served in, or in association with (e.g., in a "pop up" window above and covering (i.e., obscuring) content of the document, in a "pop-under" window in the background under the document, in "chrome" of a browser etc.) the document. The ad may partly or totally cover the document, share the screen space with the document, take screen space from the document, be partly or totally covered by the document, etc.

§4.1.2 Exemplary Ad Entry, Maintenance and Delivery Environment

FIG. 2 illustrates an exemplary ad system 120' with which the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost (cost per click-though, cost per conversion, etc.). Alternatively, or in addition, each ad group may include an average cost (e.g., average cost per click-through, average cost per conversion, etc.). Therefore, a single maximum cost and/or a single average cost may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. The ad serving operations 230 may then use relative presentation attribute assignment operations 250 to order the presentation of the ads to be returned. The accounting/billing operations 225 may be used to track charges related to the serving of advertisements and to bill advertisers. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

§4.1.3 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document with which the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request, an absolute position of the ad on the page with which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extensions of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

Various exemplary embodiments of the present invention are now described in §4.2.

§4.2 Exemplary Embodiments

§4.2.1 Facilitating the Serving of Content-Relevant Ads Using a Client-Side Application Consistent with the present invention, a client device (such as an end user system) may include one or more applications for (1) requesting one or more content-relevant ads, and (2) rendering at least one content-relevant ad with content of a requested document. The request for one or more content-relevant ads may include information about the requested document such as (i) content from the document, (ii) relevance information (e.g., concepts, topics, categories, classifications, etc.) of the content of the document, and/or (iii) a document identifier (e.g., a URL of a Web page). Returned content-relevant ads may be rendered in association with the content of the document in any number of ways, some of which were described above. The one or more client applications may include, for example, a browser, a browser plug-in, a browser toolbar, or some other application.

Figure 4:
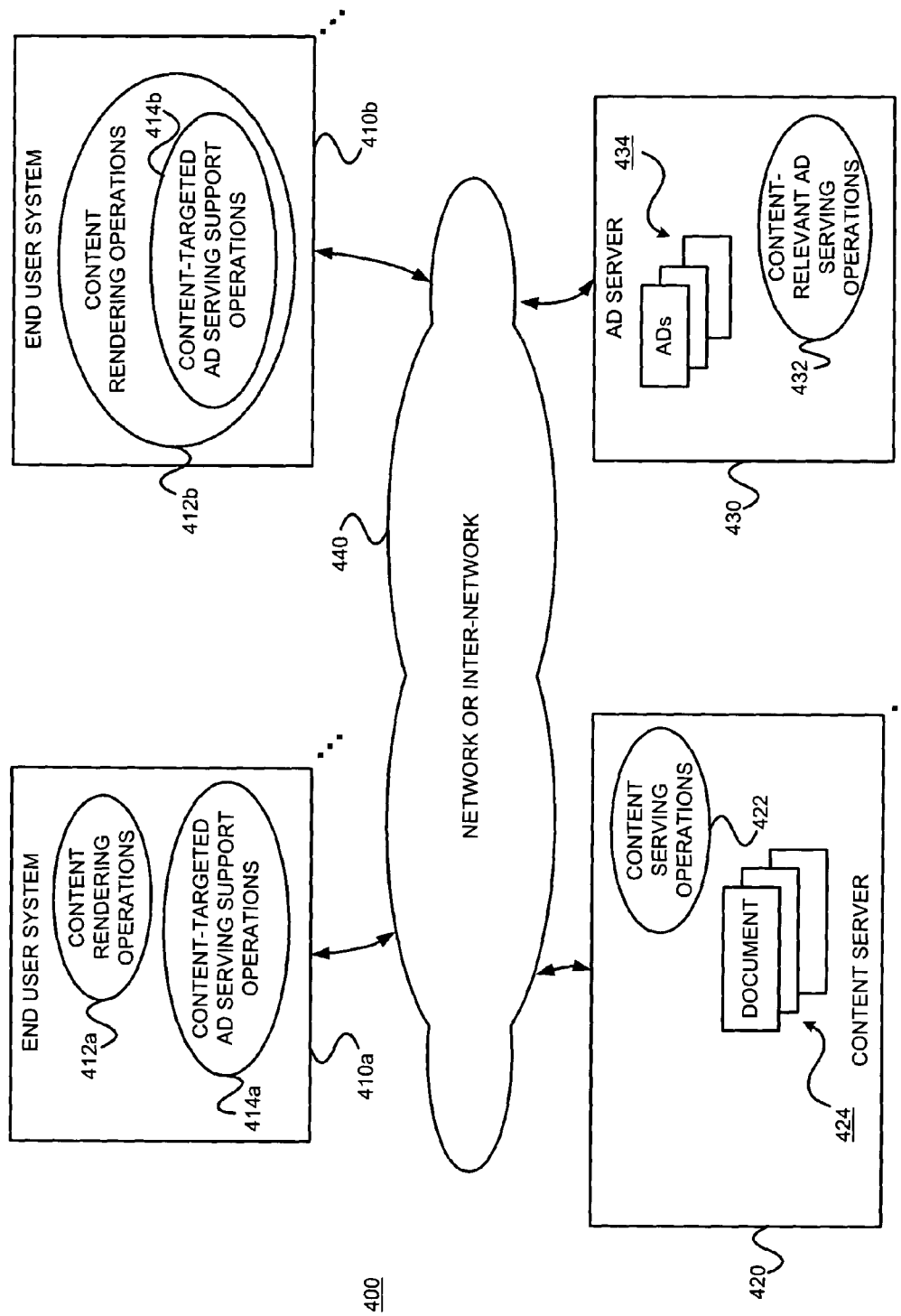
FIG. 4 is a bubble chart of operations, consistent with the present invention, that may be used with an online advertising environment, such as the one in FIG. 2.

If an end user is viewing ads on a computer, the ads can be inserted into, or presented in association with, content of a document by (i) an extension (e.g., a plug-in such as a toolbar) to the content rendering operations (e.g., a browser) on the end user's computer, (ii) the content rendering operation (e.g., browser) itself, or (iii) a separate application. For example, FIG. 4 illustrates a system 400 in which one or more end user systems 410 can request documents from one or more content servers 420 and render content of the requested documents using content rendering operations 412. An ad server 430 may be used to serve ads relevant to the content of the document. The end user system(s) 410, the content server(s) 420 and the ad server 430 may communicate with one another via one or more networks or inter-networks 440, such as the Internet for example.

As just stated, the end user systems 410 may include content rendering operations 412, such as a browser for example. One or more of the end user systems 410 may also include content-targeted ad serving support operations 414. In the foregoing example, content-targeted ad serving support operations 414 may be a browser, a plug in for a browser, an extension to a browser, (as indicated by operations 414b of content rendering operations 412b of end user system 410b) or some other application, (as indicated by operations 414a separate from content rendering operations 412a, both residing on end user system 410a).

The ad server may include one or more ads 434 (and associated ad information (not shown)), as well as content ad serving operations 432. To enhance the experience of end users, the ad server 410 should serve ads that are in some way relevant to the content requested by the end users. As an example, U.S. patent application Ser. No. 10/375,900, entitled "Serving Advertisements Based on Content", filed on Feb. 26, 2003, and listing Darrell Anderson, Paul Bucheit, Alex Carobus, Claire Cui, Jeffrey A. Dean, Georges R. Harik, Deepak Jindal, and Narayanan Shivakumar as inventors (incorporated herein by reference) describes various methods and apparatus for serving content-relevant ads. The content-relevant ad serving operations 432 may use document information in the request from the client device, either directly or to look up further document information, for determining one or more content-relevant ads. That is, document information (e.g. Web page contents) may be obtained during an ad request. For example, an application on the client device may send all the document information (e.g., Web page contents, Web page concepts, etc.) needed in the ad request, or the document information needed may be fetched using a document identifier. Document information (e.g., Web page contents) needed may be pre-fetched (i.e., obtained before a specific request) for future content-relevant ad targeting. Moreover, other methods exist for obtaining document information, such as for example the methods disclosed in U.S. patent application Ser. No. 10/113,796 (incorporated herein by reference) titled "METHOD AND APPARATUS FOR INCREASING EFFICIENCY FOR ELECTRONIC DOCUMENT DELIVERY TO USERS" filed Mar. 29, 2002, U.S. patent application Ser. No. 09/734,886 (incorporated herein by reference) titled "HYPERTEXT BROWSER ASSISTANT" filed Dec. 13, 2000, and U.S. patent application Ser. No. 09/734,901 (incorporated herein by reference) titled "SYSTEMS AND METHODS FOR PERFORMING IN-CONTEXT SEARCHING" filed Dec. 13, 2000.

Each content server 420 may include content 424, as well as content serving operations 422. In one example, the content serving operations 422 serve documents, such as Web pages for example, using a universal resource locator (URL) provided by an end user system 410.

Various different embodiments of the present invention are possible. In such embodiments, a client device (end user system) will source a document request and a request (including document information) for one or more content-relevant ads, a content server will source documents, the content ad server will source one or more content-relevant ads, and the client device will receive (directly or indirectly) both the documents and the content-relevant ads (either together or separately).

Figure 5:
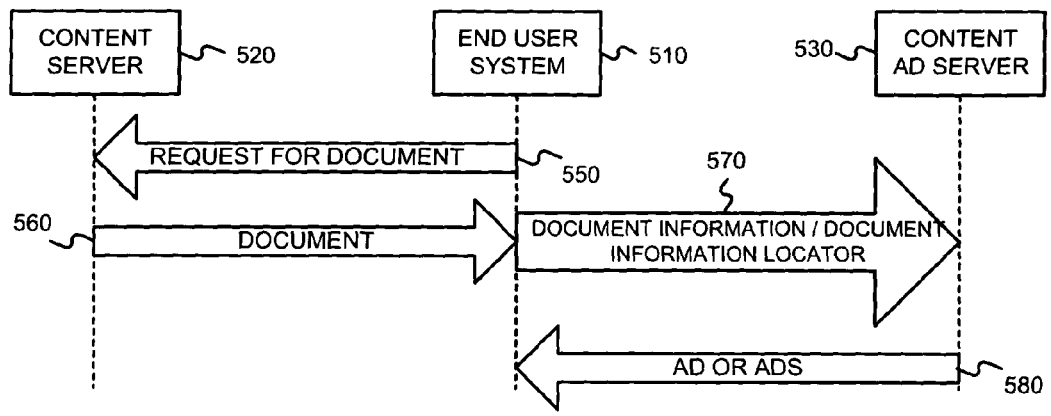
FIGS. 5 and 6 are messaging diagrams illustrating operations of various exemplary embodiments of the present invention.
Figure 6:
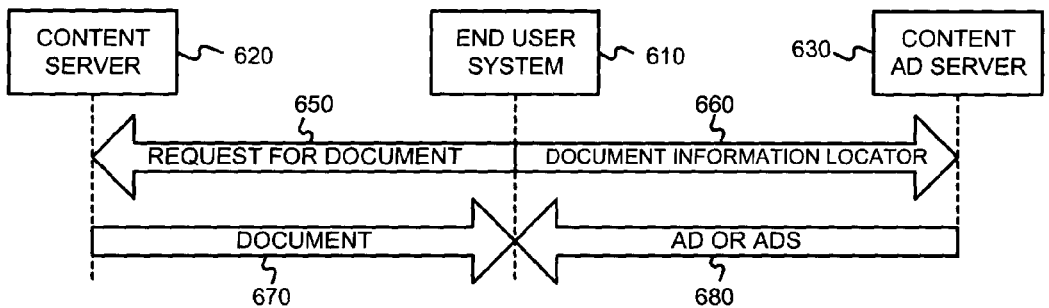

FIGS. 5 and 6 are messaging diagrams of information exchanged by an end user system (as an example of a client device), an ad server and a content server in various exemplary embodiments of the present invention. The present invention is not limited to the order of the communications shown. Other embodiments are possible and will be apparent to those skilled in the art. For example, although various embodiments may include intermediary nodes (e.g., proxies), such embodiments are not shown.

In the embodiment illustrated in FIG. 5, when an end user system 510 submits a request for a document (communication 550) to a content server 520, the content server 520 returns the requested document (communication 560) to the end user system 510. The end user system 510 then forwards document information (communication 570) to the content-relevant ad server 530. The content-relevant ad server 530 then uses document information, perhaps among other things, to determine one or more ads. The one or more ads are then provided (communication 580) to the end user system 510. In this embodiment, the end user system 510 may include means for inserting the one or more ads into the document. Alternatively, the one or more ads can be rendered in association with the document content (e.g., in a pop-up or pop-under window).

In the embodiment illustrated in FIG. 6, when an end user system 610 submits a request for a document (communication 650) to a content server 620, it also submits the document information locator (e.g., its URL) (communication 660) to the content-relevant ad server 630. The content server returns the requested document (communication 670) to the end user system 610. The content-relevant ad server 630 uses the document locator to get (e.g., previously fetched) document information. The content-relevant ad server 630 then uses this document information, perhaps among other things, to determine one or more ads. The one or more ads are then provided (communication 680) to the end user system 610. In this embodiment, the end user system 610 may include means for inserting the one or more ads into the document. Alternatively, the one or more ads can be rendered in association with the document content (e.g., in a pop-up or pop-under window).

Figure 8:
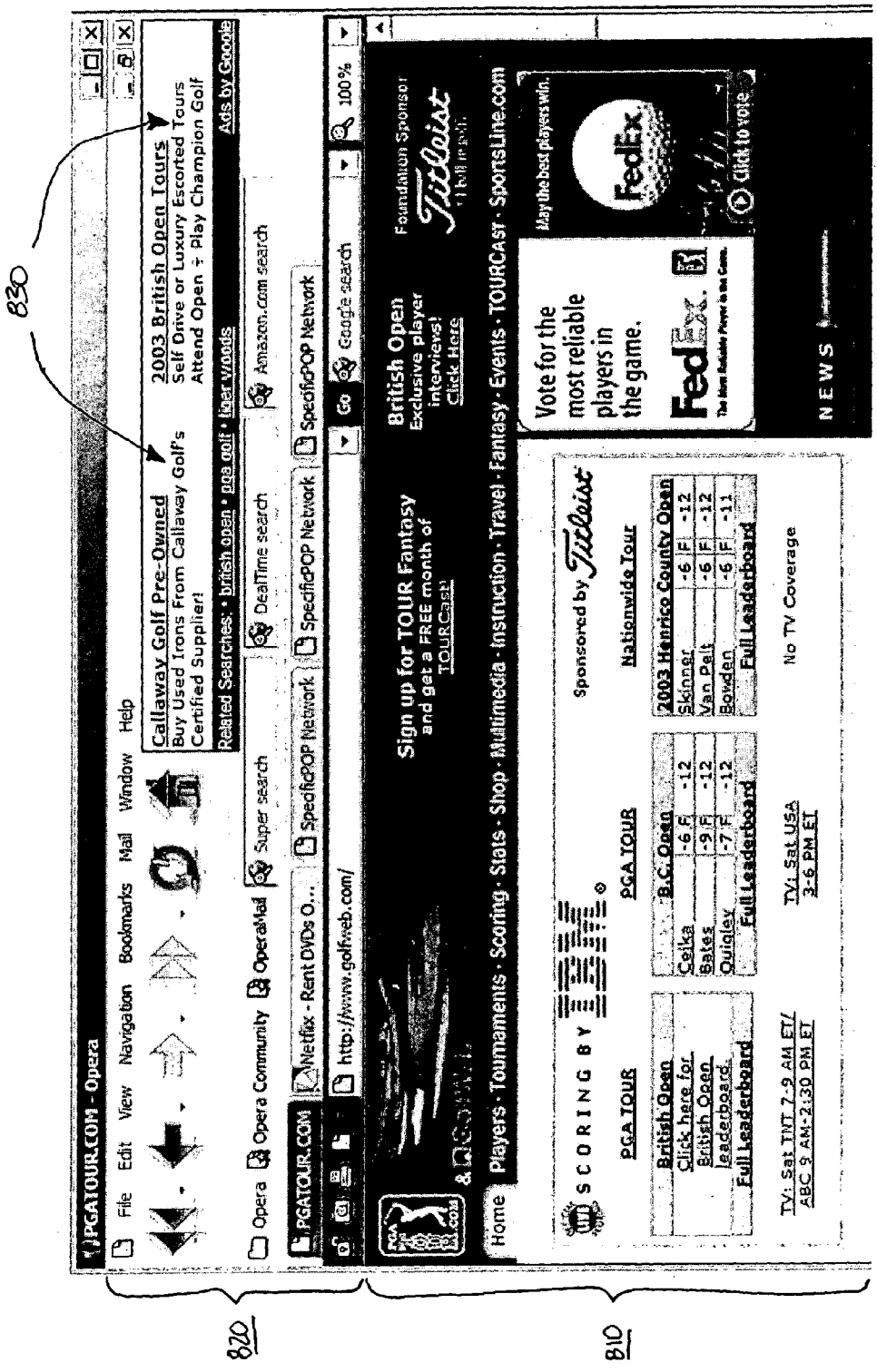
FIG. 8 illustrates a screen generated using an exemplary embodiment of the present invention.

In one exemplary embodiment a browser/toolbar on a client device sends the URL of a Web page being rendered for viewing, to the content-relevant ad server. The content-relevant ad server then uses this URL and results of a previous crawl of Web pages to determine the content/concept(s) associated with this URL. One or more ads relevant to the determined content/concept(s) are determined and returned to the browser. The browser will then render at least one of the returned ads in a browser frame (but in this particular exemplary embodiment, not in the content of the document). FIG. 8 illustrates an exemplary browser window 800 which includes a document content portion 810 and a portion referred to as the "browser chrome" 820 above the document portion. As shown, in this exemplary implementation of the invention, content-relevant ads 830 are rendered in a toolbar portion of the browser chrome 820 of the browser window 800. In an alternative embodiment (not shown), the content-relevant ads could be arranged above or below the browser chrome 820, or in the browser chrome above or below the toolbar. Naturally, content-relevant ads, or other ads, may be rendered within the body of the Web page document (e.g., using iFrames, using the Browser application to alter the markup language (e.g., HTML, XML, etc.) that was used to author the Web page, using some other client device application to alter the markup language of the Web page, etc.).

In this and other exemplary implementations of the present invention, the content of the Web page is rendered (or rendering is at least initiated) before the one or more content-relevant ads are rendered. Indeed, in one particular implementation of the present invention, the Web page can be rendered (or rendering is at least initiated) before content-relevant ads are even requested by the client device application. Doing so can be used to ensure that the rendering of the one or more content-relevant ads does not interfere with, or preempt, the loading of the Web page content. Naturally, the present invention does not require such a processing order and embodiments in which ads are rendered (or rendering of the ads is initiated) before Web page content, concurrently with Web page content, or rendered on a first-available basis may be used. In other embodiments, document identifier information (e.g. URL) may be sent to the content-relevant ad server sooner (e.g. before, or substantially concurrently with, the request for information to the content server, so that the content-relevant ad server may have more time to perform the processing/matching needed to select and return the content-relevant ad(s), thus improving the end user browsing experience.

The ad or ads can be shown in place or in a separate window. The ads are served using at least document (e.g., Web page) information. The document, and/or some information related to the document, is processed and converted to a format that allows matching with prospective ads and the selection of an appropriate, hopefully relevant, ad. The document can either be analyzed when the ad is about to be shown or could have been crawled and processed in advance. In the context of search results (or some other dynamically generated content) the ads can be inserted in an interstitial page before the search result is loaded. It can be inserted into a "cached" page mirrored on the search engine site. It can be inserted into an enclosing frame (e.g., in the case of Google Viewer).

Although not shown in the foregoing examples, the content-relevant ad server can simply return an ad identifier or ad locator to the end user system. The end user system can use the ad identifier or locator to look-up (e.g., locally) the ad. This arrangement may be advantageous if the ads are "bulky" (e.g., image ads, flash ads, etc.). More specifically, this can be used to keep the content ad server light.

§4.2.2 Exemplary Data Structures

As discussed above, ads, such as content-relevant ads, may be in the form of graphical ads such as so-called banner ads, text only ads, image ads, audio ads, video ads, ads combining one of more of any of such components, etc. The ads may also include embedded information, such as a link, and/or machine executable instructions. The ads may be encoded with a markup language such as HTML, XML, etc.

Consistent with the present invention, the request for one or more content-relevant ads sourced by the client device application(s) may include document information, perhaps as little as a document identifier such as a Web page URL. Alternatively, or in addition, the request may include one or more of the following pieces of information:

| Field | Description |
| --- | --- |
| Client | An advertising partner name. Partners may have their names prefixed with a known identifier A self-service partner may be given a designated name. |
| Format | The format to use for display. For example, format=120×600 implies the template/output parameters corresponding to 120-by-600 pixels will be used for display. The parameter file 120×600 may be read from a templates directory by the content-relevant ad server. From the parameter file, content-relevant ad server may then use the specified template file. There may be a format hierarchy implicitly associated with templates. The parameter file may be looked for in the following order: (e.g., format = 120×600_tiled, client=worldnow)<br>1. Corresponding to $FORMAT_$CLIENT, to use for display. (i.e., 120×600_tiled_worldnow);<br>2. If above not found, it tries to use the specified format. (i.e., 120×600_tiled);<br>3. If above not found, it uses the base format (i.e., 120×600). |
| Random | Due to browser caching, if a person revisits a Web page, a new request to show the ad(s) might not be generated. This field increases opportunities to serve ads by causing new requests to be generated when a Web page is revisited. |

-continued

| Field | Description |
|---|---|
| url | This may be the URL of the document with which the ad(s) will be associated. In one embodiment, the URL is expected to be properly escaped. In some cases, partners can specify url=null, if they pass other document information (e.g., "hints," or "contents," as discussed below) in the request. |
| Hl | The language of the Web page (e.g., hl=en, de, fr for English, German and French, respectively). |
| Oe | Encoding font of the Web page. |
| Adsafe | Ads may be categorized into different categories (based on for example adult content, age appropriate categories (gambling, tobacco, etc.) or any other criteria). The partner can elect to show different levels of safe ads. In one embodiment, if the value of this field is unspecified, the default value is "high" and family safe ads which are approved are shown, while porn ads are filtered. The partner can opt to show "medium" safe ads which are approved, which may include gambling ads (which are not family safe) but which still filters porn ads. A "low" value can be used to avoid filtering of ads. |
| Output | This field may be used to control the output. For example, the default option may be HTML. Other possible values include html, xml, xml__no__dtd, js, etc. |
| num__ads num (num is deprecated) | This field can be used to specify the maximum number of ads to return in the response. Exceptions are also allowed: for example, if "output=html," this parameter may be ignored. In one embodiment, this number can not exceed a hard-coded set maximum (e.g., 10). |
| alternate__ad__url | In one embodiment, this field is only applicable if "output=html." This can be useful in cases where the content ads server chooses not to show ads for certain pages (e.g., negative pages or porn pages), and the partner would prefer to get back the inventory; in such situations the partner can specify this URL. |
| contents | If contents are specified, the specified contents may be used for content-relevant ad targeting (with or without fetched or pre-fetched document information). Content scraping code (e.g., Javascript) may use this mechanism for example. In such cases, the content may go through "concept expansion" phases. The values can be any url escaped html or plain text. For example, if contents=this+is+a+document+about+%3Ch1%3Ecar+insurance+%3C/h1%3E, which in html is "this is a document about <h1>car insurance</h1>", "car insurance" may be given a higher weight due to its large font. In one embodiment, this field is specified at the end of the request, so the rest of the request is formed and passed along properly. |
| Hints | This field may be used to facilitate the use of hints. If hints are specified, they may be used in conjunction with other document content available. The hint values may be given a high weight and attached to each weight segment of the content, if available. If the document content is not available/not retrievable, the hints may be forwarded to an ad mixer for targeting without concept expansion. In one embodiment, the values are specified in the following example format: hints=car+autos,car+insurance,car+loans. This implies an OR query for "car autos"__OR__"car insurance"__OR__"car loans." |
| channel | This is a mechanism for partners to track their requests. A sample request may look like channel=bar.com+lang__en+foo__this__is__long. |
| color__bg, color__text, color__link, color__url, color__border | In one embodiment, this is a mechanism for publishers or partners to specify colors to be used in their ad formats. This permits publishers or partners to establish a uniform style or color scheme. Similar fields may also be used for other ad characteristics (colors, font type(s), font size(s), etc.), allowing publishers or partners to select from among various templates for display of ads. |
| Gl | In one embodiment, this is a parameter used for geographic targeting. In one embodiment, it specifies the country for which the request is intended. If set, it may overrides IP-based geo-targeting. |

-continued

| Field | Description |
|---|---|
| Ip | The IP address of the device originating the request. This field may be used, for example, when the request is made through a partner rather than directly from a user's browser. For example, if the partner is formatting the ads themselves, they may use predefined XML output format and thus every browser request will hit their servers which will in turn contact ours. In that case, the partner provides the browser request's IP address for spam detection and geo-targeting purposes. |
| Eip | Same as "ip" above, but "encrypted" for privacy reasons. This field may be useful, for example, if a partner has a privacy agreement such that they cannot retransmit someone's IP address. |
| Adtest | If set to "on," then all requests may be considered debug requests and don't count in terms of usage statistics (e.g., impression/clickthrough tracking). This field may be useful for partners who want to load test their Web sites without impacting ad statistics. |
| useragent | May be required for xml requests. Since the xml request is coming from a partner's server, the user-agent from the requesting browser may be needed to determine whether or not it's a robot or an offline browser. In one embodiment, if the partner did not receive anything in the user-agent header from the browser, then they should leave this blank when making the request. |

§4.2.3 Exemplary Apparatus

Figure 7:
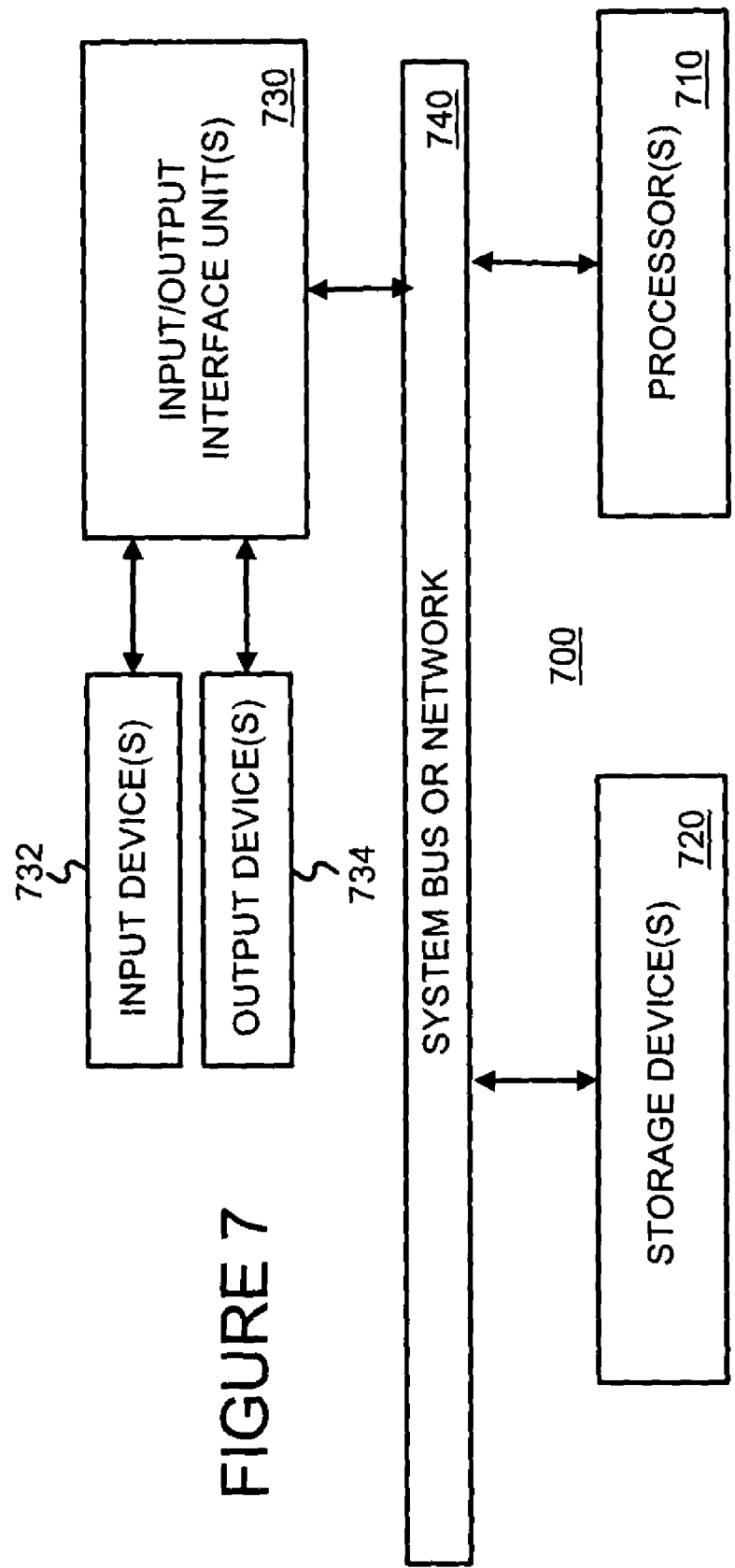
FIG. 7 is a high-level block diagram of apparatus that may be used to perform at least some of the various operations, and generate and/or store information, in a manner consistent with the present invention.

FIG. 7 is high-level block diagram of a machine 700 that may effect one or more of the operations discussed above (e.g., those performed by an end user system, those performed by a content server, or those performed by a content-relevant ad server). The machine 700 basically includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 720 and/or may be received from an external source via one or more input interface unit s730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

§4.3 CONCLUSIONS

As can be appreciated by the foregoing description, the present invention expands opportunities for advertisers to serve their ads to end users perceiving content to which the ads are relevant. One or more client device applications can be used to (i) request ads relevant to the content of a requested document and/or (ii) render one or more content-relevant ads in association with the requested document.

What is claimed is:

1. A computer-implemented method for use by an ad server system including at least one computer on a network, in an environment including a client device and the ad server system, the computer-implemented method comprising:
   a) accepting, by the ad server system, document relevance information including at least one concept extracted, by the client device, from content of a document requested by the client device, wherein the document relevance information is generated and sent to the ad server system by at least one of (A) a browser application on the client device, (B) a browser plug-in on the client device, and (C) a browser toolbar on the client device, wherein the document relevance information is automatically extracted by the client device from the document requested;
   b) determining, by the ad server system, at least one ad relevant to content of the document using at least the accepted information to find matching serving constraints stored in association with ads; and
   c) sending, by the ad server system, the at least one ad determined to the client device.

2. The computer-implemented method of claim 1 wherein the act of determining at least one ad relevant to the content of the document further uses at least ad relevance information.

3. The computer-implemented method of claim 2 wherein the ad relevance information includes an ad concept.

4. A computer-implemented method for use by a client device, in an environment including the client device and a content-relevant ad server system, the computer-implemented method comprising:
   a) receiving, by the client device, a requested document including content;
   b) extracting, automatically by the client device, concepts from the content of the received requested document;
   c) generating, by at least one of (A) a browser application on the client device, (B) a browser plug-in on the client device, and (C) a browser toolbar on the client device, a request for at least one content-relevant ad, the request including the concepts extracted by the client device;
   d) submitting, by the at least one of (A) a browser application on the client device, (B) a browser plug-in on the client device, and (C) a browser toolbar on the client device, the request for at least one content-relevant ad to the content-relevant ad server system;
   e) determining, by the content-relevant ad server system, at least one content-relevant ad using at least the extracted concepts to find matching serving constraints stored in association with ads;
   f) receiving, by the client device, at least one content-relevant ad, sourced by the content-relevant ad server system; and
   g) rendering, by the at least one of (A) a browser application on the client device, (B) a browser plug-in on the client device, and (C) a browser toolbar on the client device, at least one of the at least one content-relevant ad received.

5. The computer-implemented method of claim 4 wherein the act of rendering, by the client device, at least one of the at least one content-relevant ad received includes rendering the at least one of the at least one content-relevant ad in association with the content of the requested document.

6. The computer-implemented method of claim 4 further comprising:
   h) rendering, by the client device, the content of the document in a first window,
   wherein the at least one of the at least one content-relevant ad received is rendered in a second window.

7. The computer-implemented method of claim 6 wherein the second window is rendered over, and at least partially covers, the first window.

8. The computer-implemented method of claim 6 wherein the second window is rendered beneath the first window without covering any part of the first window.

9. The computer-implemented method of claim 6 wherein the second window is rendered adjacent to the first window.

10. The computer-implemented method of claim 4 further comprising:
    h) rendering, by the client device, content of the requested document,
    wherein the act of rendering content of the requested document is initiated before the act of submitting a request submits the request to the content-relevant ad server.

11. The computer-implemented method of claim 4 further comprising:
    h) rendering, by the client device, content of the requested document,
    wherein the act of rendering content of the requested document is completed before the act of submitting a request submits the request to the content-relevant ad server.

12. The computer-implemented method of claim 4 further comprising:
    h) rendering, by the client device, content of the requested document,
    wherein the act of rendering content of the requested document is initiated before the act of rendering at least one of the at least one content-relevant ad received is initiated.

13. The computer-implemented method of claim 4 further comprising:
    h) rendering, by the client device, content of the requested document,
    wherein the act of rendering content of the requested document is completed before the act of rendering at least one of the at least one content-relevant ad received is initiated.

14. The computer-implemented method of claim 4 wherein the act of submitting a request for at least one content-relevant ad to the content-relevant ad server system occurs before a request for the requested document.

15. The computer-implemented method of claim 4 wherein the act of submitting a request for at least one content-relevant ad to the content-relevant ad server system occurs concurrently with a request for the requested document.

16. The computer-implemented method of claim 4 further comprising:
   h) rendering, by the client device, the content of the document in a browser window,
   wherein the at least one of the at least one content-relevant ad received is rendered in the browser window.

17. The computer-implemented method of claim 4 further comprising:
   h) rendering, by the client device, the content of the document in a first part of a browser window,
   wherein the at least one of the at least one content-relevant ad received is rendered in a second part of the browser window, wherein the second part of the browser window shares no space with the first part of the browser window.

18. The computer-implemented method of claim 17 wherein the second part of the browser window is a browser chrome part of the browser window.

19. The computer-implemented method of claim 17 wherein the second part of the browser window is a browser toolbar.

20. The computer-implemented method of claim 17 further comprising:
   i) rendering, by the client device browser chrome in a third part of the browser window.

21. The computer-implemented method of claim 20 wherein the third part of the browser window is arranged between the first and second parts of the browser window.

22. The computer-implemented method of claim 20 wherein the second part of the browser window is arranged between the first and third parts of the browser window.

23. Apparatus, for use in an environment including a client device and an ad server, the apparatus comprising:
   a) at least one processor;
   b) an input device; and
   c) at least one storage device storing a computer executable code which, when executed by the at least one processor, performs a method of
      1) accepting, via the input device, document relevance information including at least one concept extracted, by the client device, from content of a document requested by the client device, wherein the document relevance information is generated and sent to the ad server system by at least one of (A) a browser application on the client device, (B) a browser plug-in on the client device, and (C) a browser toolbar on the client device, wherein the document relevance information is automatically extracted, by the client device, from the document requested;
      2) determining at least one ad relevant to content of the document using at least the accepted information to find matching serving constraints stored in association with ads; and
      3) sending the at least one ad determined to the client device.

24. The apparatus of claim 23 wherein the act of determining at least one ad relevant to the content of the document further uses at least ad relevance information.

25. The apparatus of claim 24 wherein the ad relevance information includes an ad concept.

26. Apparatus, residing on a client device, for use by the client device, in an environment including the client device and a content-relevant ad server system, the apparatus comprising:
   a) at least one processor;
   b) an input device; and
   c) at least one storage device storing a computer executable code which, when executed by the at least one processor, performs a method of
      1) receiving a requested document including content;
      2) extracting, automatically by the client device, concepts from the content of the received requested document;
      3) generating, by at least one of (A) a browser application on the client device, (B) a browser plug-in on the client device, and (C) a browser toolbar on the client device, a request for at least one content-relevant ad, the request including the concepts extracted by the client device;
      4) submitting a request for at least one content-relevant ad to the content-relevant ad server system, wherein the request includes the concepts extracted by the client device;
      5) determining, by the content-relevant ad server system, at least one content-relevant ad using at least the extracted concepts to find matching serving constraints stored in association with ads;
      6) receiving at least one content-relevant ad, sourced by the content-relevant ad server system; and
      7) rendering, by the at least one of (A) a browser application on the client device, (B) a browser plug-in on the client device, and (C) a browser toolbar on the client device, at least one of the at least one content-relevant ad received.

27. The apparatus of claim 26 wherein the act of rendering at least one of the at least one content-relevant ad received renders the at least one of the at least one content-relevant ad in association with the content of the requested document.

28. The apparatus of claim 26 further comprising:
   8) rendering the content of the document in a first window,
   wherein the at least one of the at least one content-relevant ad received is rendered in a second window.

29. The apparatus of claim 28 wherein the second window is rendered over, and at least partially covers, the first window.

30. The apparatus of claim 28 wherein the second window is rendered beneath the first window without covering any part of the first window.

31. The apparatus of claim 28 wherein the second window is rendered adjacent to the first window.

32. The apparatus of claim 26 further comprising:
   8) rendering content of the requested document,
   wherein the act of rendering initiates rendering content of the requested document before the act of submitting submits the request.

33. The apparatus of claim 26 further comprising:
   8) rendering content of the requested document,
   wherein the act of rendering completes rendering content of the requested document before the act of submitting submits the request.

34. The apparatus of claim 26 further comprising:
   8) rendering content of the requested document,
   wherein the rendering of content of the requested document is initiated before the rendering of at least one of the at least one content-relevant ad received is initiated.

35. The apparatus of claim 26 further comprising:
   8) rendering content of the requested document,
   wherein the rendering of content of the requested document is completed before the rendering of at least one of the at least one content-relevant ad received is initiated.

36. The apparatus of claim 26 wherein the submission of a request for at least one content-relevant ad to the content-relevant ad server occurs before a request for the requested document.

37. The apparatus of claim 26 wherein the submission of a request for at least one content-relevant ad to the content-relevant ad server occurs concurrently with a request for the requested document.

38. The apparatus of claim 26 further comprising:
8) rendering the content of the document in a browser window,
wherein the at least one of the at least one content-relevant ad received is rendered in the browser window.

39. The apparatus of claim 26 further comprising:
8) rendering the content of the document in a first part of a browser window,
wherein the at least one of the at least one content-relevant ad received is rendered in a second part of the browser window, wherein the second part of the browser window shares no space with the first part of the browser window.

40. The apparatus of claim 39 wherein the second part of the browser window is a browser chrome part of the browser window.

41. The apparatus of claim 39 wherein the second part of the browser window is a browser toolbar.

42. The apparatus of claim 39 further comprising:
9) rendering browser chrome in a third part of the browser window.

43. The apparatus of claim 42 wherein the third part of the browser window is arranged between the first and second parts of the browser window.

44. The apparatus of claim 42 wherein the second part of the browser window is arranged between the first and third parts of the browser window.

* * * * *